United States Patent
Fishwick et al.

(10) Patent No.: US 11,282,162 B2
(45) Date of Patent: *Mar. 22, 2022

(54) TILE BASED COMPUTER GRAPHICS

(71) Applicant: Imagination Technologies Limited, Kings Langley (GB)

(72) Inventors: Steven J. Fishwick, Kings Langley (GB); John W. Howson, Kings Langley (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/064,432

(22) Filed: Oct. 6, 2020

(65) Prior Publication Data

US 2021/0019859 A1 Jan. 21, 2021

Related U.S. Application Data

(63) Continuation of application No. 16/872,705, filed on May 12, 2020, now Pat. No. 10,885,602, which is a continuation of application No. 16/570,867, filed on Sep. 13, 2019, now Pat. No. 10,685,420, which is a continuation of application No. 15/454,792, filed on Mar. 9, 2017, now Pat. No. 10,453,164, which is a continuation of application No. 13/936,000, filed on Jul. 5, 2013, now Pat. No. 9,633,405.

(30) Foreign Application Priority Data

Sep. 12, 2012 (GB) .................................. 1216288.9

(51) Int. Cl.
G06T 1/20 (2006.01)
G06T 15/00 (2011.01)
G06T 1/00 (2006.01)

(52) U.S. Cl.
CPC .................. G06T 1/20 (2013.01); G06T 1/00 (2013.01); G06T 15/005 (2013.01)

(58) Field of Classification Search
None
See application file for complete search history.

(56) References Cited

U.S. PATENT DOCUMENTS

| | | |
|---|---|---|
| 7,167,171 B2 | 1/2007 | Heim et al. |
| 8,169,437 B1 | 5/2012 | Legakis et al. |
| 9,633,405 B2 | 4/2017 | Fishwick et al. |
| 10,163,238 B2 | 12/2018 | Isomaki |
| 10,453,164 B2 | 10/2019 | Fishwick et al. |

(Continued)

*Primary Examiner* — James A Thompson
(74) *Attorney, Agent, or Firm* — Potomac Law Group, PLLC; Vincent M DeLuca

(57) ABSTRACT

A method and system for generating and shading a computer graphics image in a tile based computer graphics system is provided. Geometry data is supplied and a plurality of primitives are derived from the geometry data. One or more modified primitives are then derived from at least one of the plurality of primitives. For each of a plurality of tiles, an object list is derived including data identifying the primitive from which each modified primitive located at least partially within that tile is derived. Alternatively, the object list may include data identifying each modified primitive located at least partially within that tile. Each tile is then shaded for display using its respective object list.

20 Claims, 7 Drawing Sheets

(56) References Cited

U.S. PATENT DOCUMENTS

| | | |
|---|---|---|
| 2004/0100465 A1 | 5/2004 | Stowe et al. |
| 2007/0146378 A1 | 6/2007 | Sorgard et al. |
| 2007/0165035 A1 | 7/2007 | Duluk, Jr. et al. |
| 2008/0150950 A1 | 6/2008 | Sorgard et al. |
| 2009/0174706 A1 | 7/2009 | Howson |
| 2010/0177105 A1* | 7/2010 | Nystad .................... G06T 11/40 345/522 |
| 2011/0080404 A1 | 4/2011 | Rhoades et al. |
| 2011/0090224 A1 | 4/2011 | Woo et al. |
| 2011/0148901 A1 | 6/2011 | Adams et al. |
| 2011/0175911 A1 | 7/2011 | Loop et al. |
| 2011/0221743 A1 | 9/2011 | Keall et al. |
| 2012/0206455 A1 | 8/2012 | Shreiner |
| 2013/0120380 A1 | 5/2013 | Kallio et al. |
| 2013/0162651 A1 | 6/2013 | Martin et al. |
| 2013/0194264 A1 | 8/2013 | Howson |
| 2013/0293544 A1* | 11/2013 | Schreyer ................ G06T 15/005 345/426 |
| 2015/0348317 A1 | 12/2015 | Hakura et al. |
| 2016/0035128 A1 | 2/2016 | Zhao et al. |
| 2016/0148337 A1 | 5/2016 | Isomaki |

\* cited by examiner

TILE BASED COMPUTER GRAPHICS

BACKGROUND

Field

The invention relates to a method and system for generating and shading a computer graphics image in a tile based computer graphics system.

Related Art

Tile based rendering is a technique for rendering 2D or 3D computer graphics images. An image is sub-divided into a plurality of blocks or tiles, which are typically rectangular, and each comprises a plurality of image pixels.

Primitive data representing geometrical objects is read from memory and transformed into screen space. Primitives are often polygons but may be lines or points. An object list is then created, for each tile, indicating the primitives, if any, which are located either partially or wholly within that tile.

Each tile is rendered independently. For each tile, the primitives identified in the respective object list are processed and hidden surface removal may be performed. The resultant pixel data for visible objects is then passed to a shading unit which applies textures and shading to each pixel within a visible object. After final pixel values have been determined for each pixel in the tile, the pixel data for the tile is written to memory for display on an output device.

For a triangle primitive the primitive data will typically comprise data defining the vertices and the surface they define, with a flag indicating relevant shading and texture data to be applied.

SUMMARY

According to a first aspect, there is provided a method for generating and shading a computer graphics image in a tile based computer graphics system, comprising the steps of: supplying geometry data; deriving a plurality of primitives from the geometry data; deriving one or more modified primitives from at least one of the plurality of primitives; for each of a plurality of image tiles, deriving an object list including data identifying the primitive from which each modified primitive located at least partially within that tile is derived; and shading each tile for display using its object list.

According to a second aspect, there is provided a method for generating and shading a computer graphics image in a tile based computer graphics system, comprising the steps of: supplying geometry data; deriving a plurality of primitives from the geometry data; deriving one or more modified primitives from at least one of the plurality of primitives; for each of a plurality of tiles, deriving an object list including data identifying each modified primitive located at least partially within that tile; and shading each tile for display using its respective object list.

Implementations of the disclosure provide that all of the modified primitives which are located (either wholly or partially) within a particular tile can be determined from the object list for that tile.

The applicant has appreciated that, in a tile based computer graphics system, if modified primitives are only derived, for each tile, after the object list for that tile has been generated, from one or more primitives identified in that object list, it is possible that not all of the modified primitives which are, in fact, located in that tile will be created. This is because, as the applicant has appreciated, modified primitives may be located in one or more different tiles from the primitive from which they are derived.

For illustration purposes, FIG. 5 is a diagram showing an image 170 divided into four rectangular tiles T1 to T4. In this diagram one primitive 180 is located entirely within tile 3 (T3). Two modified primitives which are derived from primitive 180 are illustrated as shaded in primitives. One of these modified primitives, indicated by reference numeral 190, is also located within tile 3. However, the other modified primitive 200 is in an adjacent tile, tile 4 (T4).

Thus, in this example, if the modified primitives were only derived after the object lists for each tile have been derived, during rendering of the respective tiles, the image for tile 4 would not be accurate. The object list for tile 3 would include data identifying primitive 180. Thus, when rendering tile 3 using its object list, modified primitive 190 could be derived and processed in respect of that tile. However, the object list for tile 4 would not include data identifying primitive 180, since primitive 180 is not located within tile 4. Therefore, when rendering tile 4 using its object list, primitive 200 could not be derived and processed in respect of tile 4.

Thus, implementations of the disclosure enables a more accurate, better quality image to be generated in a tile based computer graphics rendering system.

In an embodiment, at least one of the one or more modified primitives is a translated, scaled and/or rotated instance of one of the plurality of primitives.

The geometry data may define an object for display with the tile based computer graphics system. The object may be a patch of surface data and the step of deriving the plurality of primitives may comprise tessellating the patch of surface data to derive a plurality of tessellated primitives.

In embodiments of the second aspect, each of the one or more modified primitives may be assigned a unique identifier; and, for each object list, the data identifying each modified primitive located at least partially within that tile may comprise the respective unique identifier for that modified primitive.

However, the applicant has appreciated that an alternative solution, as defined in the first aspect, is that, rather than storing data identifying each modified primitive located at least partially within a particular tile, data may be stored identifying the primitive from which each modified primitive located at least partially within the tile is derived. That is, the one or more modified primitives may be assigned the same identifier as the primitive from which they are derived.

The primitive from which each modified primitive located at least partially within that tile is derived may be located in a different tile.

This first aspect has the disadvantage that the modified primitives may need to be re-derived when shading each tile for display. However, the applicant has appreciated that this first aspect has the significant advantage that the amount of data which needs to be stored in the object lists can be reduced, and that it may be possible to more fully compress the data which is stored in the object lists. Thus, the memory required to store the object lists and the memory bandwidth required to read and write the object lists to and from memory can, advantageously, be reduced.

By way of example, adjacent or spatially local primitives, for example tessellated primitives derived from tessellating a patch of surface data, are typically assigned consecutive integers as identifiers. Runs of consecutive integers can be easily compressed using simple methods such as run length encoding. However, if an integer is missing from an object list because the associated primitive is not located within that tile, the effectiveness of these compression techniques is limited. Assigning modified primitives the same identifier (integer) as the primitive from which they are derived increases the chance of a longer run of primitive integers being present within a particular object list. This is particularly the case since, in many applications, at least one modified primitive will be in the vicinity of the primitive from which it is derived. Therefore, if a primitive is located just outside a tile, it is likely that one of its modified primitives may be within that tile.

In this aspect of the invention the shading step may comprise re-deriving each modified primitive located at least partially within the tile from the primitive from which that modified primitive is derived.

In an embodiment, the deriving of the one or more modified primitives may comprise applying a modifying function that incrementally derives a sequence of modified primitives. If a plurality of modified primitives in the sequence is located at least partially within one tile, the method may further comprise storing data indicating the first and or last position in the sequence of the plurality of modified primitives.

In this embodiment, the shading step may comprise re-deriving the sequence of modified primitives and storing at least some of the modified primitives in a cache. This means that those modified primitives may not need to be re-derived more than once and the sequence may be resumed, in respect of different tiles.

The shading step may comprise re-deriving a part of the sequence of modified primitives and storing the state of the modifying function and the last re-derived modified primitive, whereby the modifying function can start re-deriving the sequence of modified primitives from the last re-derived primitive.

According to the first aspect, there is also provided a system for generating and shading a computer graphics image in a tile based computer graphics system, comprising an interface to a memory device; and a processor configured to: read geometry data from the memory device via the interface; derive a plurality of primitives from the geometry data; derive one or more modified primitives from at least one of the plurality of primitives; for each of a plurality of tiles, derive an object list including data identifying the primitive from which each modified primitive located at least partially within that tile is derived; and shade each tile for display using its respective object list.

According to the second aspect, there is also provided a system for generating and shading a computer graphics image in a tile based computer graphics system, comprising an interface to a memory device; and a processor configured to: read geometry data from the memory device via the interface; derive a plurality of primitives from the geometry data; derive one or more modified primitives from at least one of the plurality of primitives; for each of a plurality of tiles, derive an object list including data identifying each modified primitive located at least partially within that tile; and shade each tile for display using its respective object list.

BRIEF DESCRIPTION OF THE DRAWINGS

Embodiments will now be described by way of example only with reference to the accompanying drawings in which.

DETAILED DESCRIPTION

In the following example, the plurality of primitives are tessellated primitives generated by tessellating a patch of surface data. However, it will be appreciated that implementations according to the disclosure are not limited by this example and may be used equally with tessellated primitives generated by other means or with non-tessellated primitives.

Figure 1:
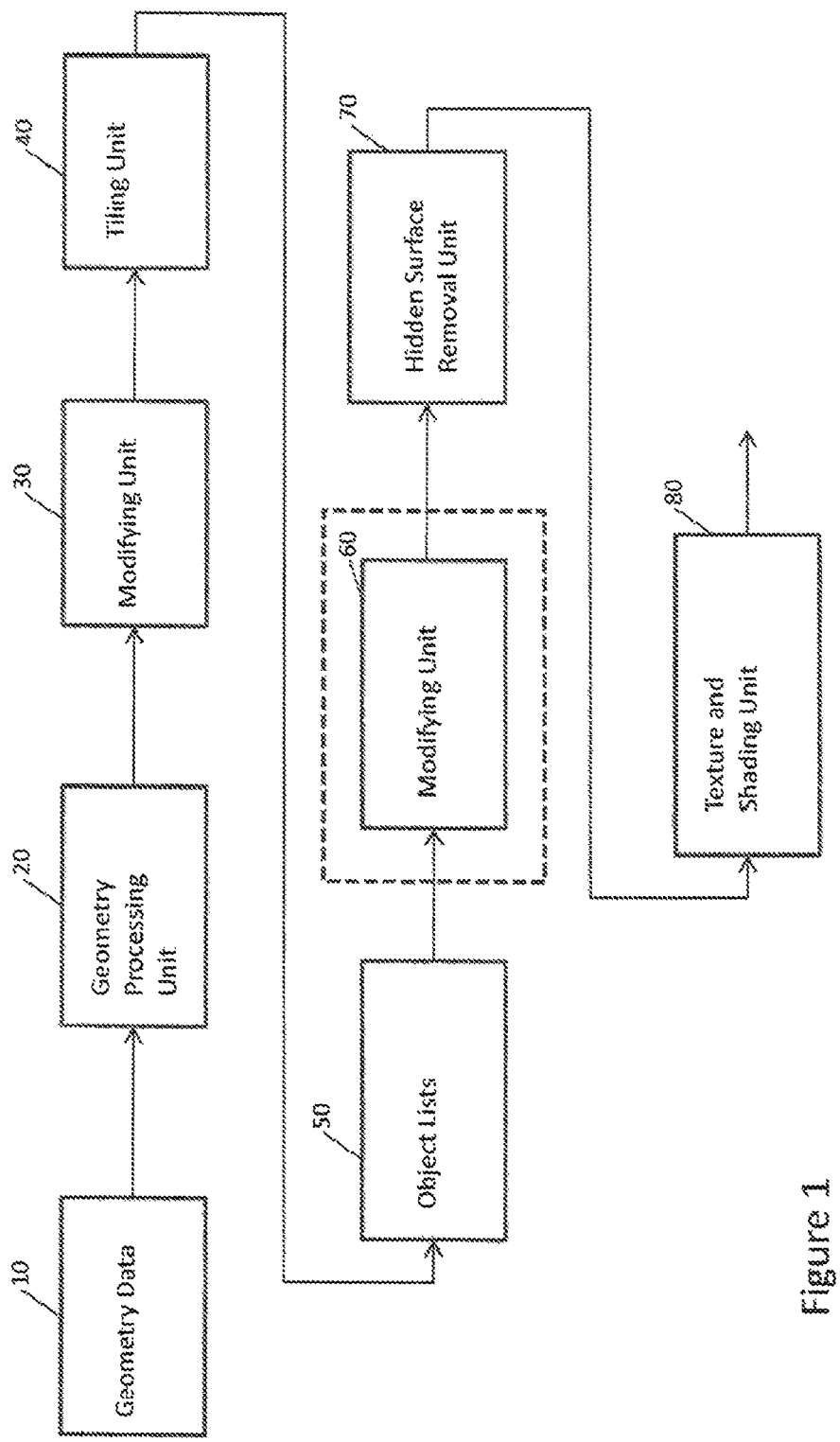
FIG. 1 depicts a schematic diagram showing an example apparatus for generating and shading a computer graphics image in a tile based rendering system according to one aspect of the disclosure.

FIG. 1 shows a schematic diagram illustrating a graphics pipeline for generating and shading a computer graphics image in a tile based rendering system. Geometry data 10 defining objects for display is supplied to a geometric processing unit 20 which derives a plurality of primitives from the object data. In this embodiment, the geometric processing unit 20 comprises a tessellation unit which derives a plurality of tessellated primitives from a patch of surface data.

Tessellation is a well-known technique, which involves breaking up a low detail model, for example a higher order surface, generally referred to within the computer graphics industry as a "patch", into a plurality of tessellated primitives. A "patch" is typically a function of a polynomial equation which defines a set of control points which describe the shape of a curve with respect to variable 't' (for a curve in two dimensions) or domain coordinates 'u,v' (for a curve in three dimensions). One example of a patch used in computer graphics is a Bezier patch, but others exist as will be appreciated by a person skilled in the art. At present, flat patches are commonly used, for example triangular patches, which are split into multiple primitives which are then displaced by a function and/or in dependence on a displacement height map to create a plurality of tessellated primitives.

As will be known to those skilled in the art, tessellation of patches of surface data in a graphics pipeline can be supported by a number of application programming interfaces (APIs), for example, Microsoft® Direct3D® 11 API. Microsoft® Direct3D® 11 API supports displacement mapping, whereby the tessellated primitives may be at a displaced location from the surface of the patch.

After the tessellated primitives have been derived the tessellated primitives to be modified are passed to modifying unit 30, which may comprise a programmatic element. Which primitives are to be modified is determined by the graphics pipeline. For each of the tessellated primitives to be modified, modifying unit 30 either culls the primitive or applies a modifying function to geometry data associated with that primitive to generate one or more geometrically modified instances of that primitive (modified primitives).

The modifying unit 30 may apply any geometric transformation, including translating, rotating or scaling transformations, or any combination thereof. The modifying unit 30 may be programmable as to what geometric transformation is applied. Each modified primitive may cover an entirely different region of the image from the primitive from which it is derived (input primitive), or the region covered by each modified primitive may overlap the region of the image covered by the input primitive.

In this example, the function generates a plurality of modified primitives. Each of the plurality of modified primitives is at a displaced location from the location of the primitive from which they are derived. These primitives may be generated incrementally. For example, the first generated primitive may be closest to the position of the input primitive, each of the subsequently generated instances being progressively further from the position of the input primitive. However, this is only one example, and these modified primitives may be generated in any order or sequence including an arbitrary order. In a defocus blur application, for example, a plurality of modified primitives may be generated at small offsets from the input primitive, without necessarily being at increasing distances from the input primitive.

The modifying unit may apply a programmable function to the vertices of the input primitive, or apply a programmable function to the patch of surface data from which the input primitive is derived and then tessellate that modified patch of surface data to derive a modified instance of the input primitive.

The resulting primitives, including the non-modified and modified primitives, are passed to tiling unit 40.

Optionally, the primitives may first be passed to a clipping and culling unit (not shown) which removes, for example, any back-facing, off-screen or non-visible primitives, and then the remaining primitives may be passed to a projection unit (also not shown) which transforms the primitives into screen space.

Figure 2:
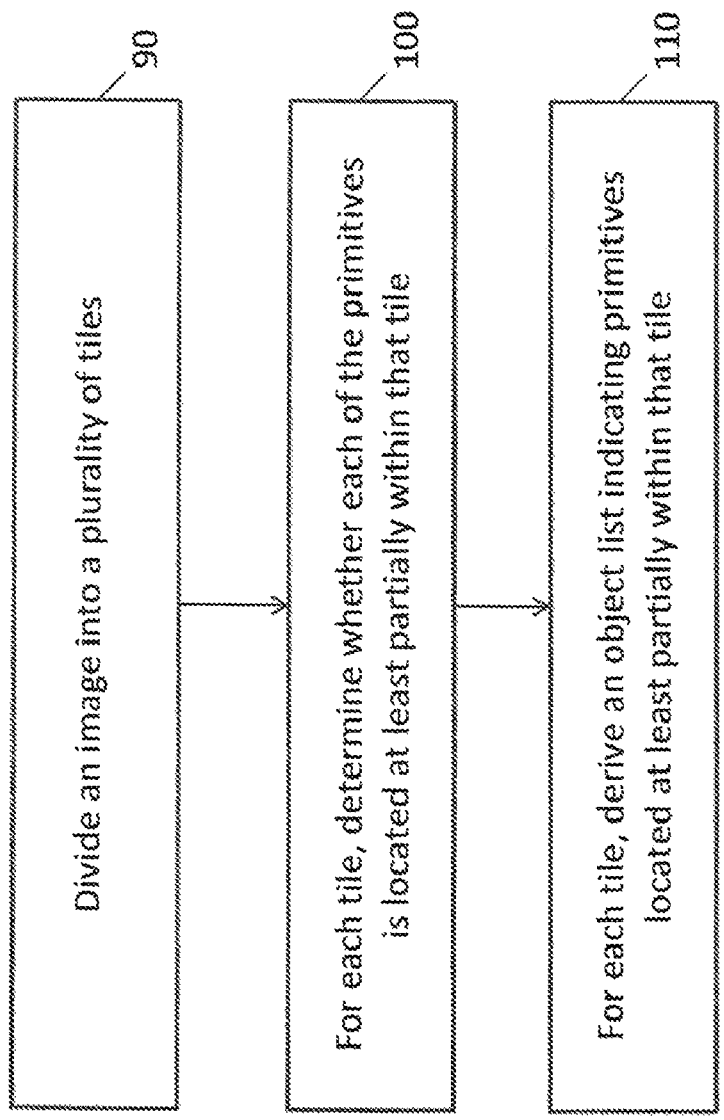
FIG. 2 depicts a flow chart showing an example of a process performed by a tiling unit in an implementation according to the disclosure.

FIG. 2 is a flow chart illustrating the steps performed by tiling unit 40.

First, at step 90, tiling unit 40 divides the screen-space viewport image into a plurality of tiles, each comprising a plurality of image pixels. Tiles are typically rectangular but can be other shapes.

At step 100, for each tile, the tiling unit 40 then determines whether each of the primitives is located at least partially within that tile. That is, whether at least part of the primitive is located within a viewable region of the tile. This can be done using a number of well-known techniques.

At step 110, the tiling unit 40 derives an object list, for each tile, indicating primitives located at least partially within that tile. An object list is created for each tile, even if there are no primitives located within a tile and therefore the object list for that tile is empty. It will also be appreciated by those skilled in the art that it is possible that not every primitive which is determined to be located within a tile is actually indicated in the object list for that tile. For example, it may be determined, at the tiling stage, that a primitive is obscured by other primitives in the tile, and therefore will not be visible within the tile. That primitive may therefore not be indicated in the object list for that tile, to save processing that primitive unnecessarily later.

The non-modified primitives may be indicated in a number of ways. Preferably, identifiers identifying each of the primitives are stored in the respective object lists. Each primitive may, for example, be assigned an index, or each of the vertices of the primitives may be assigned an index.

These identifiers may reference or provide a pointer to the geometrical data for the respective primitives or primitive vertices. However, in this embodiment, for each tessellated primitive, as described in the applicant's published GB patent publication No. 2480012, rather than storing the full geometrical data for the primitive, data is stored, for example a set of control points for the patch and the tessellation parameters, from which the geometrical data for that primitive can subsequently be derived.

Figure 3:
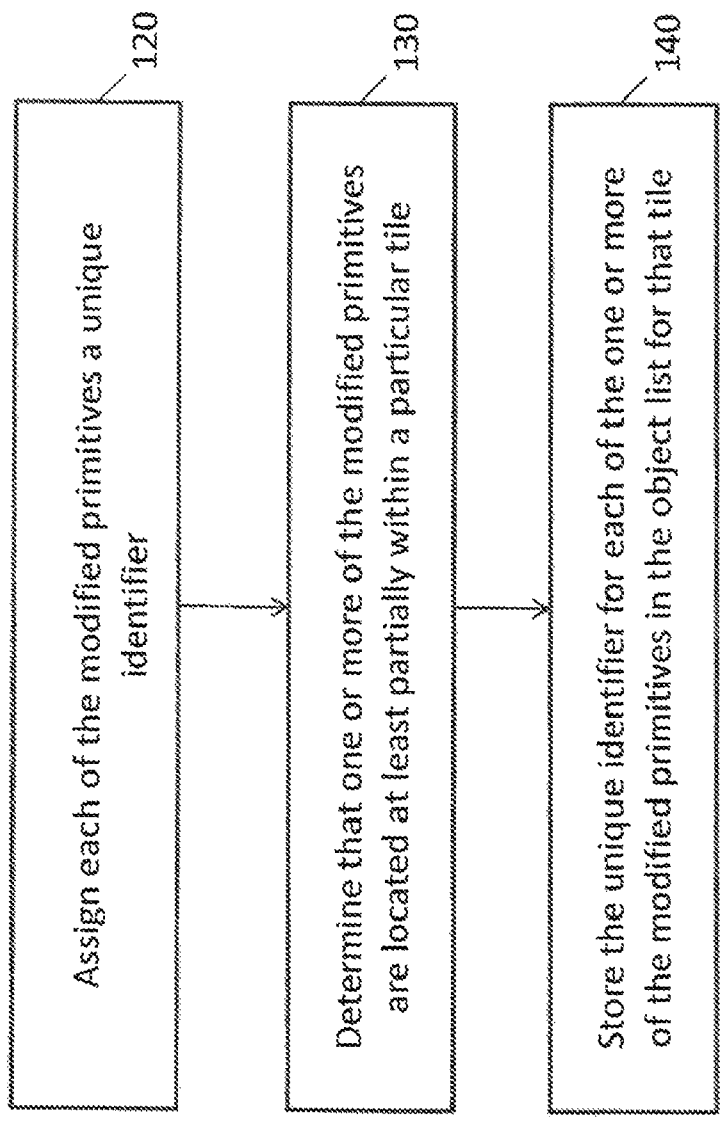
FIG. 3 depicts a further example flow chart of a process performed by a tiling unit in an implementation of the disclosure.

FIG. 3 is a flow chart illustrating a method for indicating the modified primitives in an embodiment of the invention.

At step 120, each of the modified primitives is assigned a unique identifier. For example, each of the modified primitives may be assigned a consecutive integer. If the input primitive is assigned the integer 0, the plurality of new instances of the primitive may respectively be assigned the integers 1, 2, 3, 4 . . . n. At step 130, if it is determined that one or more of the modified primitives is located at least partially within a tile, then, at step 140, the unique identifier for each of those modified primitives is stored in the object list for that tile.

Figure 5:
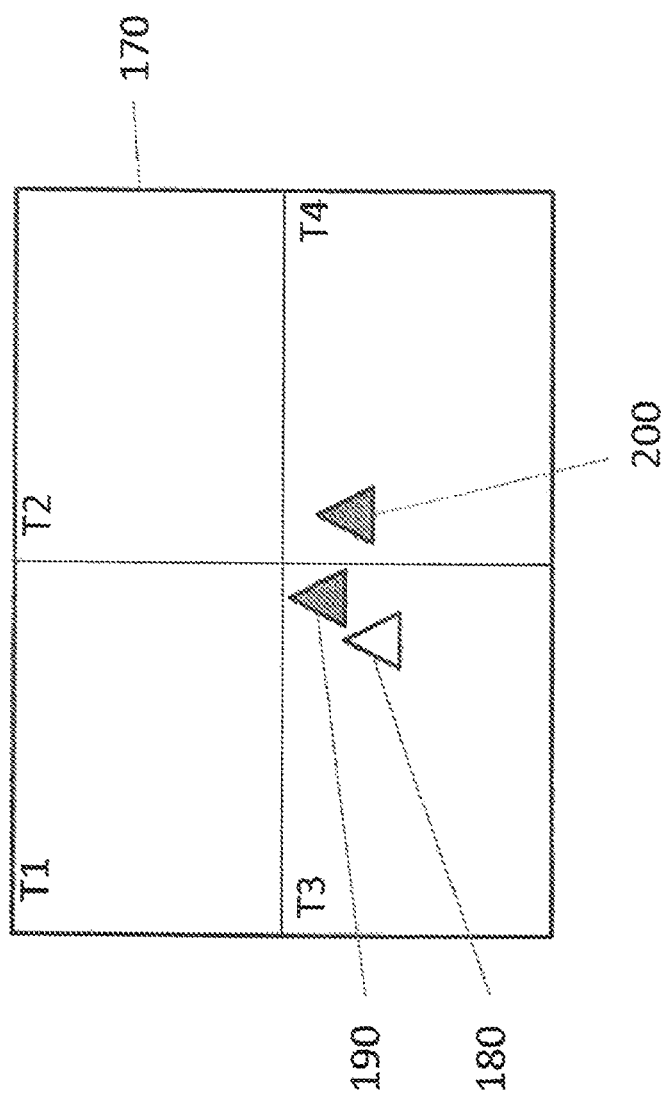
FIG. 5 depicts a diagram illustrating an image divided into a plurality of tiles.
Figure 6A:
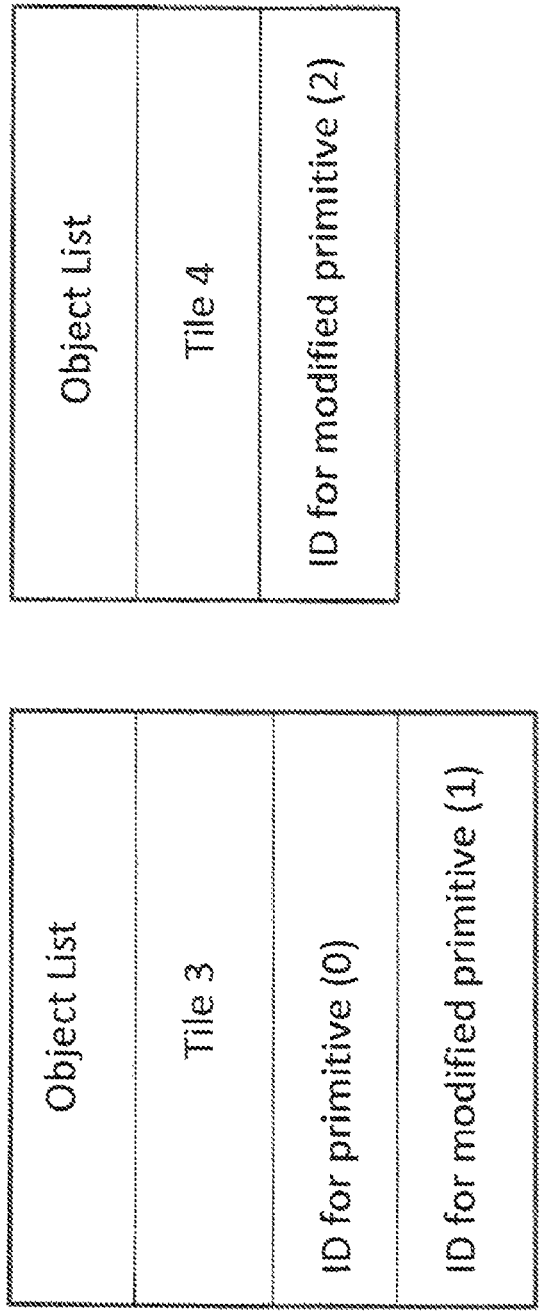
FIGS. 6a and 6b are schematic illustrations of information stored in the object lists for the tiles illustrated in FIG. 5 according to implementations of the disclosure.

For illustration purposes only, FIG. 6*a* shows the information which may be stored in the object lists for tiles 3 and 4 illustrated in FIG. 5. In this example consider that primitive 180 (the input primitive) is assigned the identifier 0. Modified primitive 190 is assigned the identifier 1 and modified primitive 200 is assigned the identifier 2. In the object list for tile 3 the identifier for primitive 180 (0) is stored and the identifier for modified primitive 200 (1) is stored. In the object list for tile 4 the identifier for modified primitive 200 (2) is stored.

Figure 4:
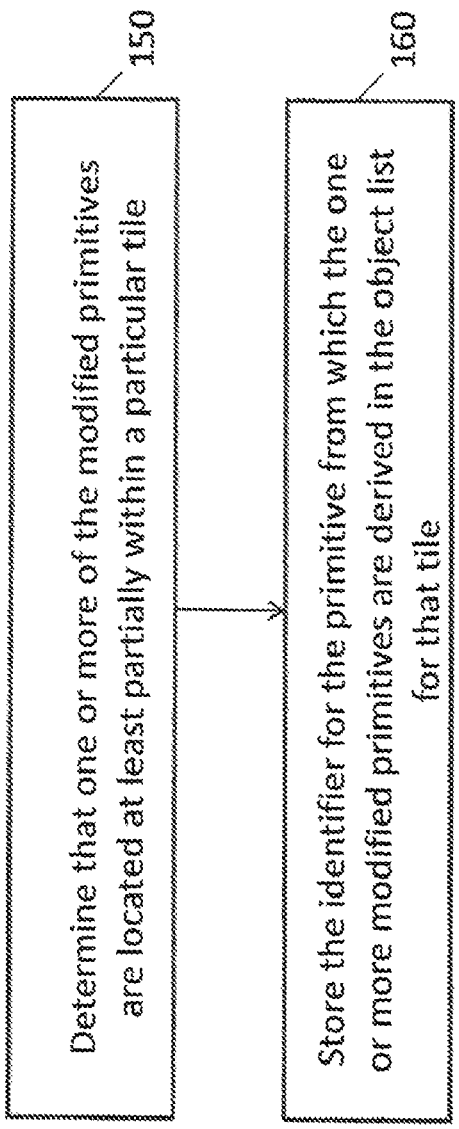
FIG. 4 depicts a further example flow chart of a process performed by a tiling unit in another implementation of the disclosure.

FIG. 4 is a flow chart illustrating an alternative method for indicating the modified primitives in a preferred embodiment of the invention.

At step 150, if it is determined that one or more of the modified primitives is located within a tile, at step 160, the identifier (the index/indices) for the input primitive, from which those modified primitives are generated, is stored in the object list for that tile. In other words, each of the modified primitives may be assigned the same identifier (index/indices) as the input primitive. For example, if the input primitive is assigned the integer 0, then each of the modified instances of that primitive are also assigned the index 0.

The index/indices for the input primitive may be stored once for each of the modified instances of that primitive located within the tile, but preferably the index/indices for the input primitive are only stored once per list, regardless of the number of instances of that primitive which are located within a particular tile.

Figure 6B:
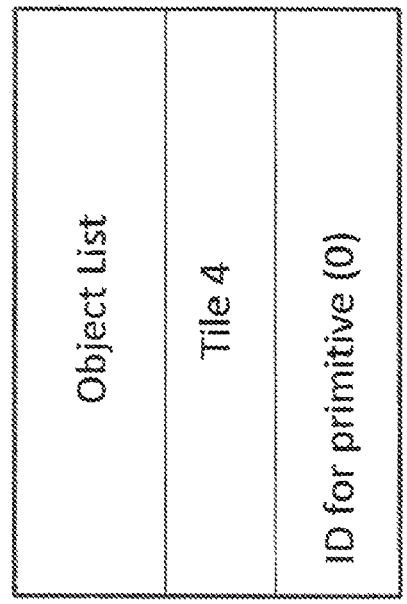
Figure 6B:
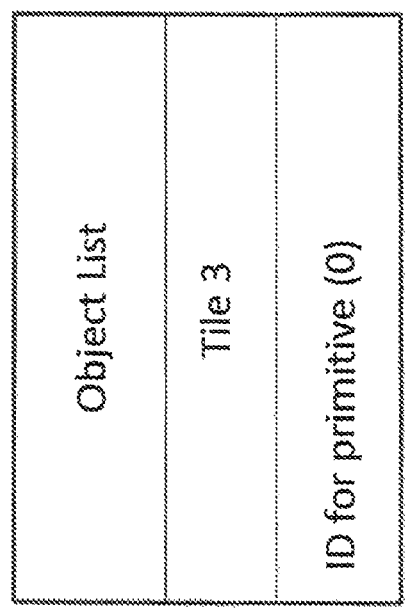

FIG. 6*b* shows the information which may be stored in the object lists for tiles 3 and 4 of FIG. 5 in this embodiment. In the object list for tile 3, the identifier for primitive 180 (0) is stored. Note that in this example, the identifier for primitive 180 (0) is only stored once although both primitive 180 and modified primitive 190, derived from primitive 180, are located within tile 3. In the object list for tile 4, the identifier for primitive 180 (0) is also stored.

In this embodiment, one may not be able to identify, from the object list for a tile, which or how many instances of a primitive identified in the object list are located within that tile. However, this embodiment nonetheless has the advantage that the input primitive, from which the modified instances are derived, is identified in the object list, if at least one of the instances of that primitive is located within the tile, regardless of whether the input primitive itself is located within that tile. Thus, similarly to the above embodiment, all modified primitives which are located within the tile may be processed to shade the tile accurately using its object list.

Furthermore, this embodiment enables the data stored in the object list to be stored in a highly compressed format.

As described in more detail below, to shade the tile the same modifying function is re-applied to each primitive identified in the object list. Then, once the modified primitives have been re-generated which ones, if any, are located within the tile can be determined using well known techniques as described above.

This embodiment does have the disadvantage however that, not only must any modified primitives located within the tile be re-generated, but modified primitives which are not, in fact, located within the tile may be computed unnecessarily. Given that each primitive may have hundreds or thousands of modified instances, this is a significant waste of computational resources.

Preferably, therefore, a flag comprising a number of bits may be stored, in the object list for a tile or in another region of memory, indicating which primitives identified in the object list have a modified instance within the tile. This avoids having to re-apply the modifying function to all of the primitives identified in the object list, whilst retaining the advantage of being able to store the data in the object lists in a highly compressed format.

As mentioned above, modified primitives are often generated incrementally, such that one modified primitive is created from the input primitive, and then a second modified primitive is created from that modified primitive and so on until a sequence of modified primitives has been derived.

In this embodiment, more preferably, in addition to storing an identifier identifying the primitive from which the sequence of modified primitives is derived, data indicating the first and/or last position in the sequence of those modified primitives located within the tile is stored. This data may be stored in the object list for that tile or in another region of memory.

This embodiment has the advantage that, where only a subset of the sequence of modified primitives is located within a particular tile, not all of the sequence of modified primitives needs to be re-derived in respect of that tile, as will be explained in more detail below.

There is, however, the trade-off that data indicating the first and or last sequence position needs to be stored for each of the primitives identified in the object list. In this described embodiment, where the primitives are tessellated primitives, it will be appreciated by those skilled in the art, that there may be thousands of primitives generated by each patch. Storing this position data for each of the primitives would require a large amount of memory.

The applicant has appreciated therefore that a good compromise, in this embodiment, is to determine the highest and or lowest sequence position of any modified primitives located within the tile which are derived from tessellated primitives derived from a patch of surface data. This means that only two integers need to be stored per tile for the entire patch. This technique may result in more unrequired modified primitives being generated, but requires less memory whilst avoiding re-deriving some unrequired modified primitives.

In some embodiments, there may be more than one type of modifying unit 30 which applies a different modifying function to an input primitive. In these embodiments, preferably, each modifying function is assigned an identifier, and the identifier identifying the modifying function which generates modified primitives which are located within a particular tile is stored. The identifier may be stored in the object list for that tile or elsewhere.

In these embodiments, data indicating the first and/or last position in the sequence of the modified primitives may be stored in respect of each of the modifying units.

The list of indices may be compressed, for example using an index/vertex buffer in a manner known to those skilled in the art.

The applicant's unpublished GB patent application no. 1104066.4 and corresponding U.S. application Ser. No. 13/416,665, which is hereby incorporated by reference in its entirety for all purposes, describes a number of techniques for compressing a list of indices of tessellated primitives derived by tessellation of a patch of surface data, which take advantage of knowledge of the internal structure of a tessellated patch of surface data.

It will be appreciated that a significant advantage of assigning the modified primitives the same index/indices as the input primitive is that the same compression techniques may be utilised to compress the index/indices.

The object lists 50 may be stored in memory, for example in a buffer.

Referring back to FIG. 1, in an implementation, to shade each tile for display the object list for the tile is read and, where necessary, the list of indices stored in the object list is decompressed.

In this implementation, the indices for the tessellated primitives, and the associated patch data and tessellation factors, are passed to a tessellation unit (not shown). The tessellation unit re-tessellates the patch of surface data to derive geometrical data for the tessellated primitives identified in the object list.

A modifying function may then be re-applied by modifying unit 60 to geometrical data associated with one or more of the primitives to re-derive the one or more modified primitives, for example if data is read indicating that a modified instance of that primitive is located within the tile.

Modifying unit 60 may be the same unit as modifying unit 30 or a separate unit which applies the same modifying function as modifying unit 30. Where multiple modifying units, which apply different modifying functions, are used to generate modified primitives before tiling, it will be appreciated that modifying unit 60 must apply the same modifying function as the function applied to the input primitive before tiling. Which modifying function should be applied may be determined for example by reading the modifying function identifier for that primitive. Exemplary modifying units can include a programmable processor element configured by a sequence of instructions embodying a process, which can be retrieved from a non-transitory machine readable medium. Another example implementation can use hardware that is configurable through the usage of configuration data supplied with a set of primitives. These examples of modifying units thus also provide means for modifying, according to the disclosure.

As mentioned above, some modifying units may operate incrementally and, even if it is known which instances of the primitive are within a particular tile, it may not be possible to generate only those instances.

In this case, all of the modified instances generated by the modifying unit 60 may be stored in local memory, for example in a cache. This has the advantage that, where the instances are spread over more than one tile, the modifying unit may not need to be applied a second time for the same primitive, in respect of a further tile. Before modifying unit 60 is applied to a primitive identified in an object list, it may be determined whether the modified primitive instances are already stored in the cache. If so, there is no need to re-apply the modifying unit 60 again for that primitive.

In an alternative approach, the modifying unit 60 may be halted after the last primitive located within a particular tile has been generated. This may be determined, for example, by reading data indicating the last primitive in the sequence located within that tile. In this embodiment, the state of the modifying unit 60 may be stored, as well as the last generated modified primitive, so that the modifying unit can continue execution from where it has stopped for another tile. Thus, where for example the first 100 modified primitives have been generated, and then the $101^{st}$ modified primitive is required by a subsequent tile, the modifying unit does not have to start re-deriving the sequence of modified primitives from the beginning. The first modified primitive located within a particular tile may be determined by reading the data indicating the position of the first modified primitive in the sequence located within the tile.

In this alternative approach, before modifying unit 60 is applied to a primitive identified in the object list, it may be determined whether any modified primitive with the same identifier is stored in the cache. If so, the nearest modified primitive in the sequence to the required modified primitive may be fetched, and where the state of the modifying unit has been stored, the modifying unit can continue execution from that modified primitive until the required modified primitive is generated. In applications where the modified primitives must be generated incrementally the nearest modified primitive earlier in the sequence may not necessarily be the closest modified primitive. Other examples of deriving a sequence of modified primitives include applying a modification function to a primitive or primitives. The specific actions taken during such derivation may depend on how the primitives are expressed in a particular implementation and the nature of modifications to be effected on such primitive(s).

Once the modified instances have been re-generated, if necessary, which ones of the instances are within a particular tile may be determined using well known techniques, as described above.

For each tile, after data for each of the modified primitives and non-modified primitives located within that tile has been obtained, the primitives may be processed to render the image using well known techniques.

For example, the primitives may be passed to hidden surface removal unit 70, which removes any surfaces which are not visible in the tile, and the resulting pixel data may be passed to a texture and shading unit 80 which applies pixel or texture shading before the final pixel values for display are written to memory.

The steps or elements of the methods described herein may be carried out in any suitable order, or simultaneously where appropriate, unless constrained by the defined outputs of different steps. Additionally, individual blocks may be deleted from any of the methods without departing from the spirit and scope of the subject matter described herein, unless otherwise apparent from the disclosure. Aspects of any of the examples described above may be combined with aspects of any of the other examples described to form further examples without losing the effect sought. Where elements of the figures are shown connected by arrows, it will be appreciated that these arrows show just one example flow of communications (such as data and control messages) between elements and other configurations may be provided in other implementations.

Aspects according to the disclosure also include machine readable descriptions of hardware that can operate according to an aspect of the disclosure. For example, Register Transfer language (RTL) may describe such aspect(s). RTL may be generated on a general purpose computer using known programming techniques. The RTL generators may also be programmable generators embodied by hardware configured with software to produce a description of an implementation of hardware performing such aspect(s) of the disclosure. Such description may then be synthesised and manufactured.

Therefore, in addition to hardware embodiments (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, SystemC Register Transfer Level (RTL) and so on, or other available programs, databases, and/or circuit (i.e., schematic) capture tools. Embodiments can be disposed in a machine usable medium including non-transitory memories such as memories using semiconductor, magnetic disk, optical disk, ferrous, resistive memory, flash memory, and so on. Such machine readable information can be accessed over networks from network attached storage, from storage area networks, from remote file servers, and so on.

As specific examples, it is understood that implementations of disclosed apparatuses and methods may be implemented in a semiconductor intellectual property core, such as a microprocessor core, or a portion thereof, embodied in a Hardware Description Language (HDL)), that can be used to produce a specific integrated circuit implementation. Examples of HDLs include Verilog HDL and VHSIC Hardware Description Language, where VHSIC stands for is Very High Speed Integrated Circuit. A computer readable medium may embody or store such description language data, and thus constitute an article of manufacture. A non-transitory machine readable medium is an example of computer readable media. Examples of other embodiments include computer readable media storing Register Transfer Language (RTL) description that may be adapted for use in a specific architecture or microarchitecture implementation. Additionally, the apparatus and methods described herein may be embodied as a combination of hardware and software that configures or programs hardware.

Any reference to 'an' item refers to one or more of those items, unless otherwise constrained by context. The term 'comprising' is used herein to mean including the method blocks or elements identified, but that such blocks or elements do not comprise an exclusive list and an apparatus may contain additional blocks or elements and a method may contain additional operations or elements.

Computer executable instructions (which when executed cause the processor to implement one or more steps from the methods described herein) may be provided using any computer-readable media that is accessible by the processor, such as a non-transitory medium. Computer-readable media may include, for example, computer storage media such as memory 1108 and communications media. Computer storage media, such as memory 1108, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include non-transitory communication media. Aspects of functions, and methods described and/or claimed may be implemented in a special purpose or general-purpose computer including computer hardware, as discussed in greater detail below. Various functionality can be provided in customized FPGAs or ASICs or other configurable processors. Such processing functionality may be used in personal computers, desktop computers, laptop computers, message processors, hand-held devices, multi-processor systems, microprocessor-based or programmable consumer electronics, game consoles, network PCs, minicomputers, mainframe computers, mobile telephones, PDAs, tablets, embedded applications, such as televisions, automobiles, sensors, robots, and the like.

The invention claimed is:

1. A method in a tile-based graphics processing system for processing one or more primitives derived from geometry data defining objects for display, the method comprising:
deriving a sequence of geometrically modified primitives from at least one of the one or more primitives; and
for each of a plurality of tiles, deriving an object list including data identifying the primitive from which the sequence of geometrically modified primitives is derived if at least one of the geometrically modified primitives is located at least partially within that tile, and storing data indicating the first and/or last position in the sequence of the geometrically modified primitives located within that tile.

2. The method of claim 1, wherein deriving the sequence of geometrically modified primitives comprises applying a modifying function that incrementally derives the sequence of geometrically modified primitives.

3. The method of claim 2, further comprising:
shading each tile for display using its respective object list,
re-deriving at least part of the sequence of geometrically modified primitives and storing at least some of the sequence of geometrically modified primitives in a cache, and
storing the state of the modifying function and the last re-derived geometrically modified primitive, whereby the modifying function can start re-deriving the sequence of geometrically modified primitives from the last re-derived primitive.

4. The method of claim 1, wherein the object list derived for each tile further includes primitive identifying data identifying each of the said one or more primitives that are located at least partially within the tile.

5. The method of claim 4, further comprising, for each of the plurality of tiles: storing data indicating which primitives identified in the object list for the tile have a geometrically modified primitive derived from that primitive within the tile.

6. The method of claim 5, further comprising, for each tile, reading the object list for the tile and re-deriving each geometrically modified primitive located at least partially within the tile from the primitive from which that geometrically modified primitive is derived for shading the tile.

7. The method of claim 6, wherein the re-deriving step comprises applying a modifying function to each primitive in the object list for the tile identified by the stored data to re-derive each geometrically modified primitive located at least partially within the tile.

8. The method of claim 1, wherein the deriving step comprises deriving the sequence of geometrically modified primitives from at least one of the one or more primitives using a plurality of modifying functions, the method further comprising assigning to each modifying function an identifier identifying that modifying function.

9. The method of claim 8, further comprising, for each of the plurality of tiles: storing each identifier that identifies a modifying function which generates a geometrically modified primitive located within that tile.

10. The method of claim 9, further comprising, for each of the plurality of tiles: reading a modifying function identifier for each primitive in the object list for the tile; and re-applying the identified modifying function to the primitive to re-derive the geometrically modified primitives located at least partially within the tile for shading the tile.

11. The method of claim 1, further comprising:
shading each tile for display using its respective object list, and
re-deriving the sequence of geometrically modified primitives and storing at least some of the sequence of geometrically modified primitives in a cache.

12. A system for processing one or more primitives derived from geometry data defining objects for display in a tile-based graphics processing system, comprising:
a modifying unit configured to derive a sequence of geometrically modified primitives from at least one of the one or more primitives; and
a tiling unit configured to, for each of a plurality of tiles, derive an object list including data identifying the primitive from which the sequence of geometrically modified primitives is derived if at least one of the geometrically modified primitives is located at least partially within that tile; and store data indicating the first and/or last position in the sequence of the geometrically modified primitives located within that tile.

13. The system of claim 12, wherein the modifying unit is further configured to derive the sequence of geometrically modified primitives by applying a modifying function that incrementally derives the sequence of geometrically modified primitives.

14. The system of claim 12, wherein the tiling unit is configured derive an object list for each tile that further includes primitive identifying data identifying each of the said one or more primitives that are located at least partially within the tile.

15. The system of claim 14, wherein the tiling unit is further configured to store, for each of the plurality of tiles, data indicating which primitives identified in the object list have a geometrically modified primitive derived from that primitive within the tile.

16. The system of claim 15, wherein the modifying unit is further configured to, for each tile: read the object list for the tile; and re-derive each geometrically modified primitive located at least partially within the tile from the primitive from which that geometrically modified primitive is derived for shading the tile.

17. The system of claim 16, wherein the modifying unit is configured to apply a modifying function to each primitive in the object list for the tile identified by the stored data to re-derive each geometrically modified primitive located at least partially within the tile.

18. The system of claim 12, wherein the modifying unit is configured to derive the sequence of geometrically modified primitives from at least one of the one or more primitives using a plurality of modifying functions; the modifying unit being configured to assign to each modifying function an identifier identifying that modifying function.

19. The system of claim 18, wherein the tiling unit is further configured to store, for each of the plurality of tiles, each identifier that identifies a modifying function which generates a geometrically modified primitive located within that tile.

20. A non-transitory computer readable storage medium having stored thereon a computer readable dataset description of an integrated circuit that, when processed in an integrated circuit manufacturing system, causes the integrated circuit manufacturing system to manufacture a tile-based graphics processing apparatus, comprising:
- a modifying unit configured to derive a sequence of geometrically modified primitives from at least one of one or more primitives derived from geometry data defining objects for display; and
- a tiling unit configured to, for each of a plurality of tiles, derive an object list including data identifying the primitive from which the sequence of geometrically modified primitives is derived if at least one of the geometrically modified primitives is located at least partially within that tile; and store data indicating the first and/or last position in the sequence of the geometrically modified primitives located within that tile.

* * * * *